(12) United States Patent
Hong et al.

(10) Patent No.: US 9,392,547 B2
(45) Date of Patent: Jul. 12, 2016

(54) DIVERSITY RECEIVER

(75) Inventors: Seung-Chul Hong, San Diego, CA (US); Sheng Ye, Carlsbad, CA (US); Tienyu Chang, Carlsbad, CA (US); Anand K. Anandkumar, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 994 days.

(21) Appl. No.: 13/014,539

(22) Filed: Jan. 26, 2011

(65) Prior Publication Data

US 2012/0057621 A1  Mar. 8, 2012

Related U.S. Application Data

(60) Provisional application No. 61/298,279, filed on Jan. 26, 2010.

(51) Int. Cl.
*H04L 1/02* (2006.01)
*H04W 52/02* (2009.01)
*H04B 7/08* (2006.01)

(52) U.S. Cl.
CPC ......... *H04W 52/0264* (2013.01); *H04B 7/0871* (2013.01)

(58) Field of Classification Search
CPC ...... H04B 1/109; H04B 1/001; H04B 1/0028; H04B 7/0814; H04B 7/082; H04B 7/0808; H04L 1/06; H04L 27/2647
USPC ........................ 375/347, 316; 455/561, 277.1
See application file for complete search history.

(56) References Cited

U.S. PATENT DOCUMENTS

| | | | | |
|---|---|---|---|---|
| 5,499,397 | A * | 3/1996 | Wadin et al. | 455/277.1 |
| 5,940,452 | A * | 8/1999 | Rich | 375/347 |
| 2002/0004375 | A1* | 1/2002 | Spencer et al. | 455/277.1 |
| 2004/0229650 | A1 | 11/2004 | Fitton et al. | |
| 2008/0096509 | A1 | 4/2008 | Ling | |
| 2009/0170461 | A1 | 7/2009 | Kwon et al. | |
| 2009/0258625 | A1 | 10/2009 | Ling et al. | |

OTHER PUBLICATIONS

International Preliminary Report on Patentability with Written Opinion for PCT Application No. PCT/US2011/022538, mailed Aug. 9, 2012; 9 pages.
International Search Report and Written Opinion corresponding to the PCT Application No. PCT/US2011/022538, date of mailing Mar. 25, 2011, 20 pages.

* cited by examiner

*Primary Examiner* — Daniel Washburn
*Assistant Examiner* — Fitwi Hailegiorgis
(74) *Attorney, Agent, or Firm* — Kilpatrick Townsend & Stockton LLP (57) ABSTRACT

A diversity receiver includes a first receiving channel and a second receiving channel. The receiver also includes a baseband processor that computes a difference between the received signal strengths of the signals received from the first and second channels, wherein the processor disables the signal received from the second channel if the difference is greater than a first threshold value and a BER associated with the second receiving channel is greater than a BER threshold value, and disables the signal received from the first channel if the difference is less than the negative first threshold value and the bit error rate (BER) associated with the first channel is greater than the BER threshold value. The receiver further includes a bypass circuit coupled to an input of an amplifier and a RSSI circuit that provides a conduction path between the input and a ground when the RSSI circuit detects a blocker signal.

20 Claims, 9 Drawing Sheets

| Signal processing element | Benefit | Drawback | Mode 1 | Mode 2 | Mode 3 |
|---|---|---|---|---|---|
| Filter | Rejection of blockers | Insertion loss (reduced sensitivity) | RX1 turned on when blocker is detected to be larger than a predetermined threshold while RX2 is turned off. Switch S1 may be turned on to protect RX2 from the blocker signal. | Signal path 2 turned on when blockers are absent, and signal path 1 turned off | Both signal paths turned on to improve maximum signal handling of the receiver |
| attenuator | Improved power-handling | Insertion loss (reduced sensitivity) | RX1 turned on when input power levels are strong | Signal path 2 turned on when signal power falls below a predetermined threshold | |
| Amplifier, e.g., LNA | Improved sensitivity | Power consumption, reduced power handling | RX1 turned on when signal level drops below a predetermined threshold | Signal path 2 turned on when desired signal rises above a predetermined threshold; and SP1 is turned off. | |
| Comments | | | SWP1 on, SWP2 off, impedance matching in RX1 adjusted to optimize matching to AN1 | SWP2 on, SWP1 off, SP1 is turned off where applicable. Impedance matching in RX2 adjusted to optimize matching to AN1 | Both SWP1 and SWP2 are on, impedance matching in RX1 and RX2 are adjusted to optimize matching to AN1 |

FIG. 10

FIG. 11 they are costly and introduce non-negligible loss, thereby
DIVERSITY RECEIVER

CROSS-REFERENCES TO RELATED APPLICATIONS

The present application claims benefit under 35 USC 119 (e) of U.S. provisional application No. 61/298,279, filed Jan. 26, 2010, entitled "Diversity Receiver," the content of which is incorporated herein by reference in its entirety.

BACKGROUND OF THE INVENTION

Figure 1:
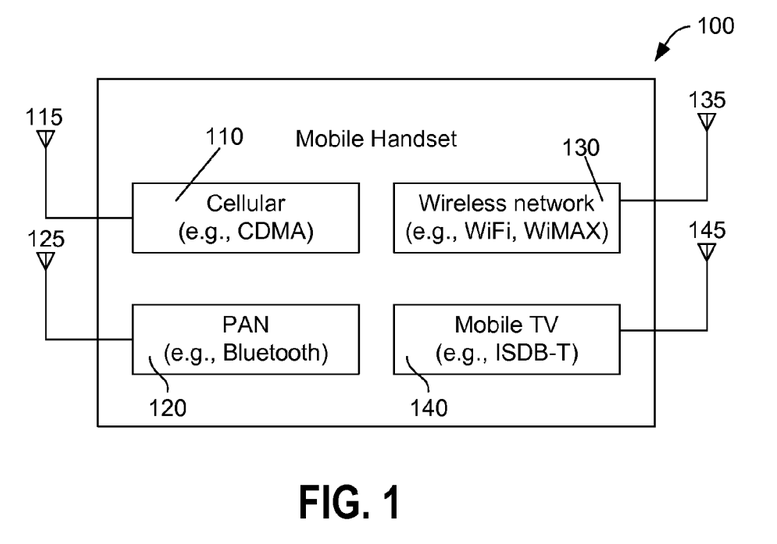
FIG. 1 shows a number of transmitting/receiving blocks of a handset unit that can be used in embodiments of the present invention.

Antenna diversity can significantly improve the performance of a wireless receiver system but also increases the cost. In order to keep the cost down, most wireless receiver systems in consumer applications use a single antenna receiver. In many handset units, the components that cause cellular transmissions (such as CDMA) are located in relatively close proximity of other wireless receivers (such as WiFi, Bluetooth, or mobile TV receivers) disposed in the handset unit. FIG. 1 shows a number of processing units of a conventional handset 100. Handset 100 is shown as having a CDMA cellular unit 110, a Bluetooth transceiver 120, a WiFi or WiMAX transceiver 130, and a mobile TV receiver 140. Each of these four units is shown as having a single dedicated antenna.

Figure 2:
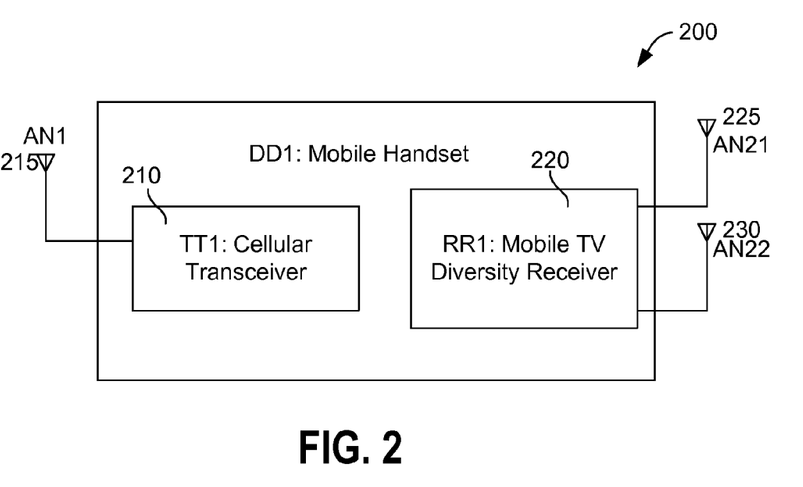
FIG. 2 shows a handset unit that includes a cellular CDMA (GSM) transceiver and a mobile TV diversity receiver that can be used in embodiments of the present invention.

FIG. 2 shows a handset unit 200 that includes, in part, a cellular CDMA transceiver 210 having an antenna 215, and a mobile TV diversity receiver 220 having antennas 225 and 230. Because of their close proximity, transmissions from cellular transceiver 210 often couple significantly to receiver 220. This problem is further compounded by the relatively high power that transceiver 210 requires to transmit data.

The present invention provides systems and methods for allowing a diversity system to function effectively without having to double the off-chip components required to protect the diversity system from transmissions due to other systems within the handset.

In this application, the following definitions are used:
CDMA, GSM, WiFi, GPS and mobile TV are representative of any wireless transceiver or receiver systems within a given application or device;
Handset is representative of any electronics application which places wireless systems for various standards in close proximity, such as a set-top box, television, navigation system, automotive or medical device.
Blocker is any undesired jamming signal, from the standpoint of any given receiver. In the following description of the present invention is made with reference to a mobile TV receiver and the mobile TV signals is considered as the desired signals; all other signals in the spectrum are viewed as blockers.
SAW filter refers to a surface acoustic wave device designed to perform a filtering function; however, it is representative of any hardware (e.g., microwave ceramic filter) required to perform filtering.

Figure 3A:
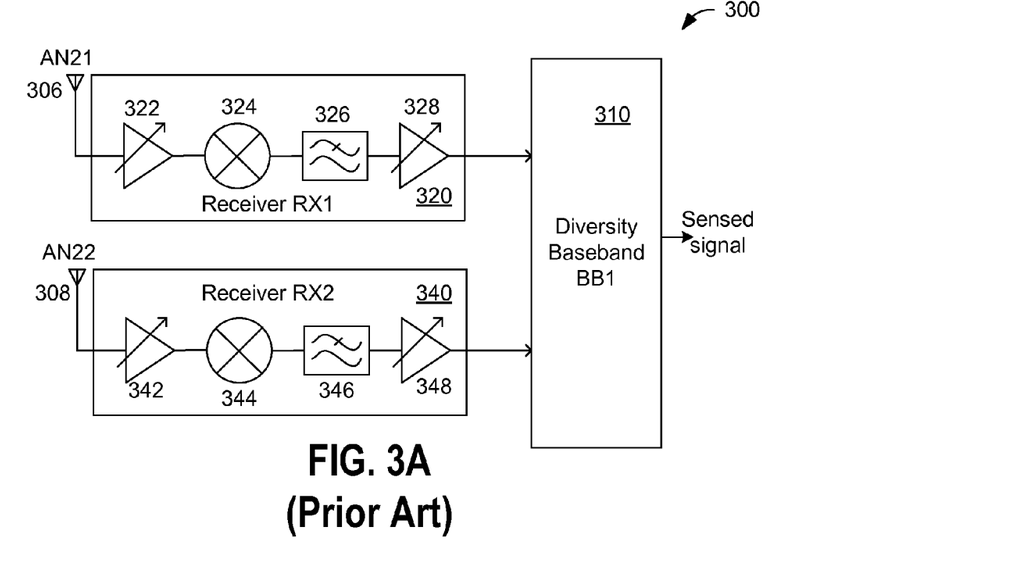
FIG. 3A shows a conventional diversity receiver system having two receiving channels sharing a diversity baseband processor, as known in the prior art.

FIG. 3A shows a conventional diversity receiver system 300 having two receiving channels, namely a first receiving channel 320 and a second receiving channel 340. First receiving channel 320 is shown as including a low-noise amplifier 322, a mixer 324, a filter 326, and an amplifier 328. Likewise, second receiving channel 340 is shown as including a low-noise amplifier 342, a mixer 344, a filter 346, and an amplifier 348. Diversity baseband processor 310 combines the signals it receives from first and second receiving channels 320 and 340, using any one of a number of well-known algorithms, to generate and output a sensed signal. For example, poor SNR from antenna 308 compared with the SNR from antenna 306 causes the diversity baseband processor 310 to weight the signal from antenna 308 less than from antenna 306. A variety of diversity weighting and combining algorithms exist for this purpose. In OFDM systems, for example, weighting may be performed on a subcarrier basis. Embodiments of the present invention may take advantage of any of diversity algorithms.

Figure 3B:
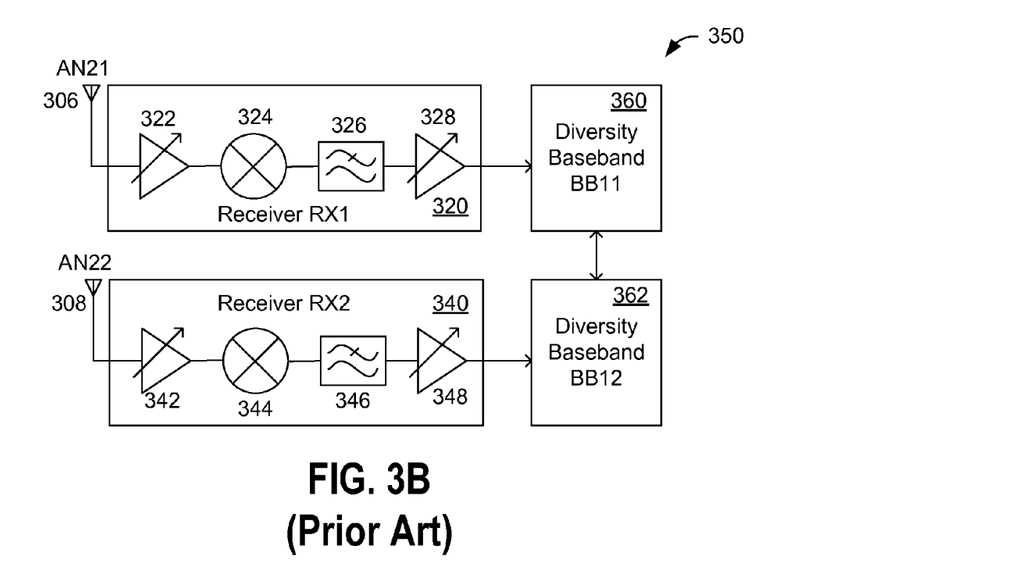
FIG. 3B shows a conventional diversity receiver system having two receiving channels each having a dedicated diversity baseband processor, as known in the prior art.

FIG. 3B shows a conventional diversity receiver system 350 having a pair of receiving channels 320 and 340 that are similar to the receiving channels 320 and 340 of FIG. 3A. Diversity receiver system 350 includes a first diversity baseband processor 360 that receives the output signal of amplifier 328, and a second diversity baseband processor 362 that receives the output signal of amplifier 348. Diversity baseband processors 360 and 362 communicate with one another to assess, in conformity with a selected diversity algorithm, the signal quality or signal-to-noise ratio (SNR) from antennas 306, 308, and to weight the signal received from each channel based on this assessment. For example, poor SNR from antenna 308 compared with the SNR from antenna 306 causes the baseband processors to assign less weight to the signal from antenna 308 than the signal from antenna 306. It is understood that the embodiments of the present invention may include any number of diversity branches that are greater than two.

Figure 4:
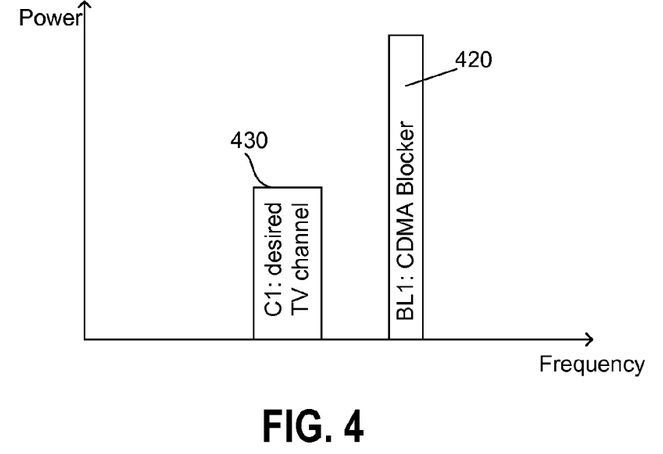
FIG. 4 shows an example of EM radiation spectrum seen by a handset that can be used in embodiments of the present invention.

FIG. 4 shows an example of the EM (electromagnetic) radiation spectrum seen by a handset unit such as handset unit 200 shown in FIG. 2. Signal 420 is transmitted by transceiver 210 and is commonly referred to as the blocker signal. Signal 430, which has a frequency that is close to the frequency of signal 420, is the desired TV channel being received by receiver 220. Signal 420 is often a strong signal and thus can severely interfere with the reception of signal 430.

Figure 5:
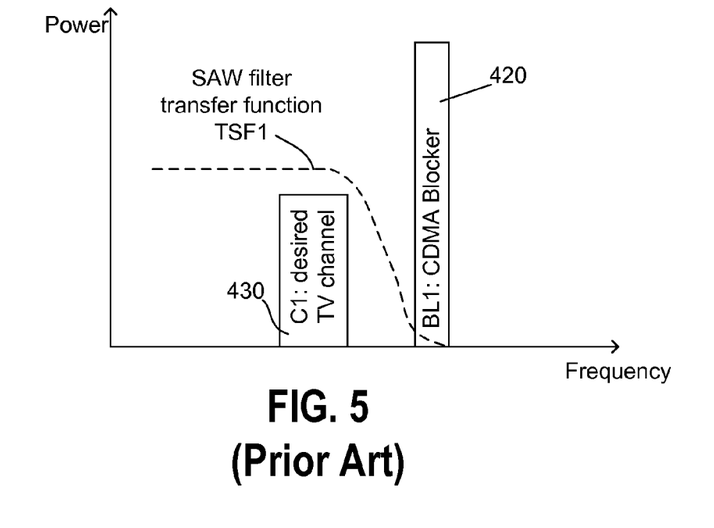
FIG. 5 shows a typical transfer function of a SAW filter used to attenuate the blocker signal of FIG. 4, as known in the prior art.

To attenuate the blocker signals, a SAW filter is commonly used in the receiving channel. FIG. 5 shows a typical transfer function 510 of a SAW filter, which as is seen, has a sharp frequency roll-off to attenuate the blocker signal 420. SAW filters are commonly used in front of sensitive receivers to provide this effect. One disadvantage of SAW filters is that they are costly and introduce non-negligible loss, thereby directly degrading the noise figure of the receiver.

Figure 6:
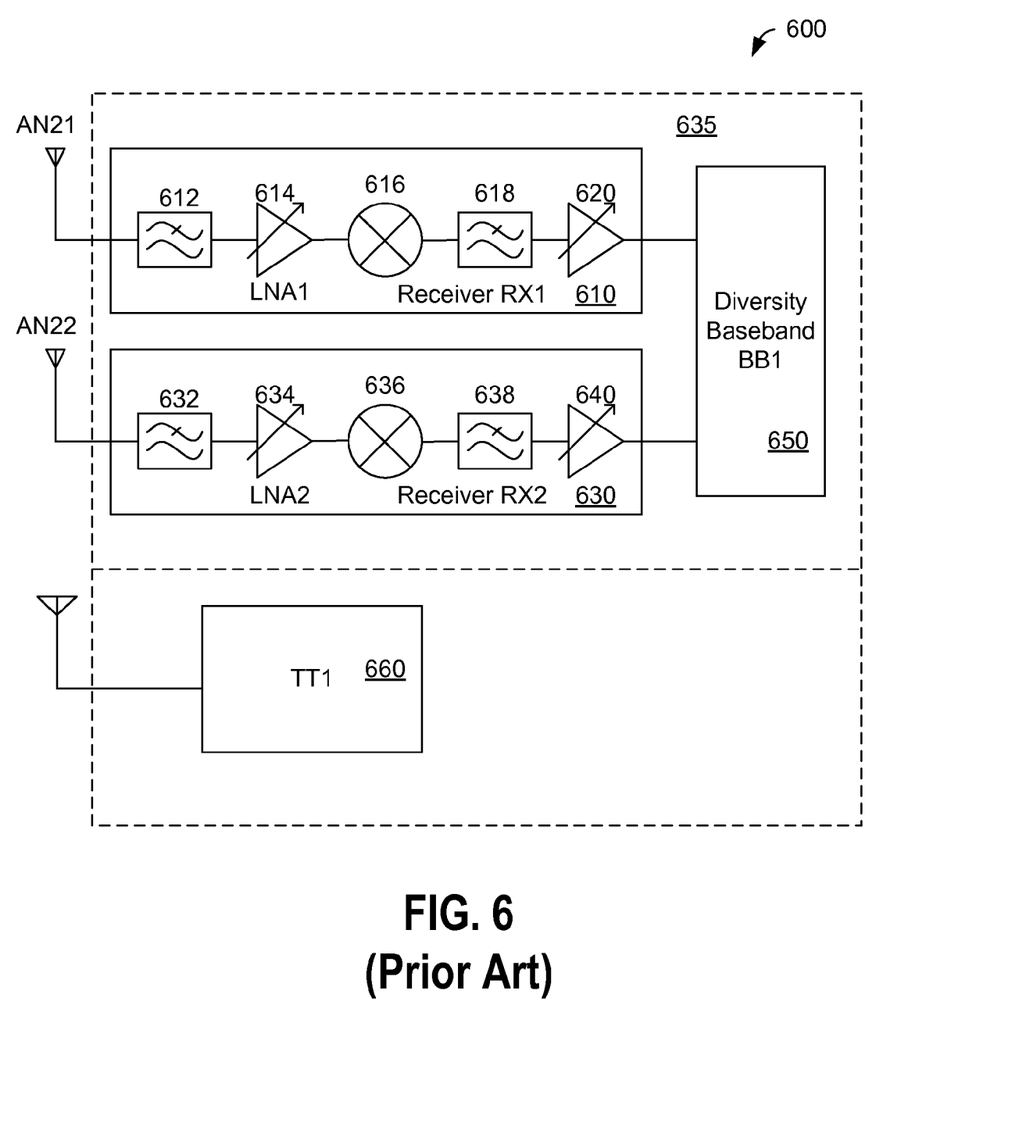
FIG. 6 shows a diversity receiver that includes a SAW filter in each of its receiving channels, as known in the prior art.

Conventional diversity receivers use a SAW filter in each of the diversity channels. FIG. 6 shows a handset unit 600 that includes diversity receiving channels 610, 630, diversity baseband processor 650, and a transceiver 660 according to conventional art. Receiving channel 610 includes a SAW filter 612, a low-noise amplifier (LNA) 614, a mixer 616, a filter 618, and an amplifier 620. Receiving channel 630 includes a SAW filter 632, an LNA 634, a mixer 636, a filter 638, and an amplifier 640. Baseband processor 650 receives the output signals of amplifiers 620 and 640, and combines them in accordance with any one of a number of well-known algorithms to generate and output the sensed signal that is received. As was described above, the inclusion of SAW filter 632 in the second receiving channel 630 increases the cost of handheld unit 600 and is thus undesirable. Furthermore, in the cases where the reception level (signal strength) of one receiving channel is significantly greater than that of the other channel, this will pose a problem of wasteful consumption of power.

BRIEF SUMMARY OF THE INVENTION

Embodiments of the present invention provide many benefits over conventional techniques. Embodiments of the present invention provide a diversity receiver that is capable of dynamically controlling the use of space diversity (antenna diversity), hence prevents the wasteful power consumption when the use of space diversity is not necessary. Embodiments of the present invention also provide a control method for such diversity receiver.

In a specific embodiment of the present invention, a diversity receiver includes a first receiving channel responsive to a first antenna, the first receiving channel may include a first switch, a filter; a first amplifier, and a first mixer. The diversity receiver also includes a second receiving channel responsive to a second antenna, the second receiving channel may include a second switch, a second amplifier, a second mixer, and a received signal strength indicator (RSSI) circuit operative to detect a blocker signal, wherein the first switch, the filter, the first amplifier and the first mixer are connected in series, and wherein the second switch, the second amplifier and the second mixer are connected in series. In an embodiment, the first and second antennas may be a same antenna. In an embodiment, the first switch may be interposed between the first antenna and the filter. In another embodiment, the first switch may be interposed between the filter and the first amplifier. In an embodiment, the second switch may be interposed between the second antenna and the second amplifier. In another embodiment, the second switch may be interposed between the second amplifier and the second mixer.

In an embodiment, the diversity receiver further includes a baseband processor that processes signal strengths received from the first and second receiving channels and computes a difference between the received signal strengths from the first and second receiving channels. In an embodiment, the baseband processor disables the use of the signal received from the second receiving channel if the difference is greater than a first threshold value and a bit error rate (BER) associated with the second receiving channel is greater than a BER threshold value; and disables the use of the signal received from the first receiving channel if the difference is less than the negative first threshold value and a bit error rate (BER) associated with the first channel is greater than the BER threshold value. In an embodiment, the baseband processor combines the signals received from the first and second receiving channels if the difference is less than a second threshold value. In an embodiment, the first threshold value can be dynamically varied. In an embodiment, the difference is computed by a time average of the signals received through the first and second receiving channels. In another embodiment, the difference is estimated using Doppler frequencies associated with the first and second receiving channels.

In an embodiment, the diversity receiver additionally includes a bypass circuit that is coupled to an input terminal of the second amplifier, wherein the bypass circuit provides a conduction path between the input terminal and a ground when the RSSI circuit detects the blocker signal. In an embodiment, the diversity receiver may be disposed in a device having at least a transceiver.

Embodiments of the present invention provide a method for controlling a diversity receiver. The method includes determining a difference between strengths of signals received via the first and second receiving channels, disabling use of the signal received from the second receiving channel if the difference is greater than a first threshold value and a bit error rate (BER) associated with the second channel is greater than a predetermined BER value, and disabling the use of the signal received from the first receiving channel if the difference is less than the negative first threshold value and the BER associated with the channel is greater than the second threshold value.

In an embodiment, the strength of the signal received via the first channel is estimated using a gain value associated with the first channel, and wherein the strength of the signal received via the second channel is estimated using a gain value associated with the second channel. In an embodiment, the difference is computed by a time average of the signals received through the first and second receiving channels. In another embodiment, the difference is estimated using Doppler frequencies associated with the first and second receiving channels.

In yet another embodiment, the method further includes switching the diversity receiver to a antenna diversity state when the difference is less than a second threshold value.

DETAILED DESCRIPTION OF THE INVENTION

In accordance with embodiments of the present invention, a diversity receiver includes more receiving channels than SAW filters and thus has enhanced reception characteristics and costs less. A diversity receiver with two receiving channels, in accordance with embodiments of the present invention, thus dispenses the need for a second saw filter. A SAW filter is understood to refer to any surface acoustic wave filter designed to perform a filtering operation, or to any other hardware that performs the required filtering operation.

Figure 7:
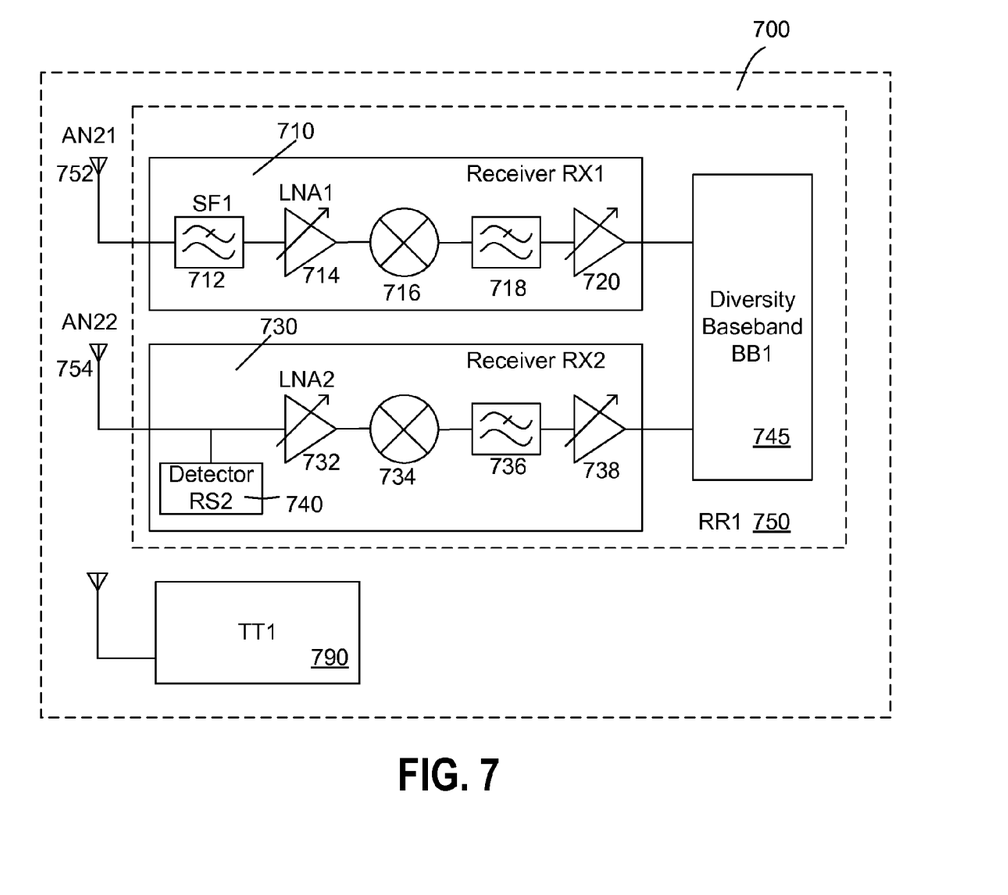
FIG. 7 is a block diagram of a handset unit that includes a diversity receiver and a transceiver, in accordance with an embodiment of the present invention.

FIG. 7 is a block diagram of a transmitting/receiving unit 700 having a receiver RR1 750 and a transceiver TT1 790.

Although transmitting/receiving unit 700 is shown as having a receiver and a transceiver, it is understood that a transmitting/receiving unit in accordance with embodiments of the present invention may have any number of receivers, transmitters, and/or transceivers. For example, transmitting/receiving unit 700 may have CDMA, GSM, WiFi, WiMAX and Bluetooth transceivers as well as a mobile TV receiver (and/or a GPS receiver). Furthermore, a transmitting/receiving unit (which is alternatively referred to herein as a handset unit or unit) may be representative of any electronic device which places wireless systems for various standards in close proximity to one another, such as a set-top box, television, navigation system, base station, automotive or medical device.

Diversity receiver 750 is shown as including two receiving channels (alternatively referred to herein as receive channels), namely receiving channels 710 and 730. Receiving channel 710 is shown as including a SAW filter 712, a low-noise amplifier (LNA) 714, a mixer 716, a filter 718, and an amplifier 720 which may be an automatic gain control (AGC) amplifier. Receiving channel 730 is shown as including a received signal strength indicator (RSS1) circuit RS2 740, a low-noise amplifier 732, a mixer 734, a filter 736, and an amplifier 738 which may be an AGC amplifier. Although in the exemplary embodiment 700 of the present invention, RSSI circuit 740 is shown as being positioned between antenna 754 and LNA 732, it is understood that RSSI circuit 740 may be positioned at any other point along the receiving channel 730 in conformity with the implementation of this receiving channel. Diversity receiver 750 is also shown as including a diversity baseband processor 745 adapted to combine the output signals of the first and second receiving channels 710 and 730, in accordance with any one of a number of well-known algorithms, to generate the sensed signal that is received by the receiver.

RSSI circuit 740, which may be frequency-selective or broadband, is adapted to detect any blocker signal that may be generated by the transmitters, such as transceiver 790, disposed in unit 700. Because the second receiving channel 730 does not have a SAW filter, second receiving channel 730 does not suffer from a degraded noise figure and insertion loss that would be otherwise caused by the SAW filter when the transmitter in transceiver 790 is not transmitting. The following description of the embodiments of the present invention may be made with reference to a mobile TV receiver where the mobile TV signals are considered as the desired signals and all other signals in the spectrum are considered as blocker signals. It is understood, however, that a blocker signal is any undesired jamming signal from the standpoint of a given receiver. It is also understood that embodiments of the present invention can be applied to transmitting/receiving units having a GPS receiver or other receivers as well.

Since the diversity path associated with the second receiving channel 730 is assigned a weight of at least zero, and often more, diversity receiver 750 operates at least as effectively as, and often better, than a receiver with a single path. Furthermore, because the second receiving channel 730 has an enhanced noise figure, as described above, diversity receiver 750 has a better reception characteristics than conventional diversity receivers when transceiver 790 is not transmitting.

When Transceiver 790 is not transmitting, both receiving channels 710 and 730 are operated to enable diversity mode of operation for receiver 750. In this mode, diversity baseband processor 745 assigns a weight to the signal received in each receiving channel and combines these signals to generate the sensed signal. Any one of a number of well known algorithms for assigning weights to, and combining the signals received in each of the receiving channels, may be used.

As described above, RSSI circuit 740 is used to detect whether transmissions by transceiver 790 give rise to the presence of blocker signals in receiver 750. To achieve this, in one embodiment, RSSI circuit 740 compares the strength (value) of the blocker signal it receives to a predefined threshold value. If the strength of the signal received by RSSI circuit 740 is detected to be greater than the threshold value, RSSI circuit 740 considers the received signal as a blocker signal. When a blocker signal is detected (by RSSI 740) as being present in the receive channel 730, diversity baseband processor 745 lowers the weight it assigns to the signal in receive channel 730 in proportion to the strength of the blocker signal detected by RSSI 740. In one embodiment, if the strength of the blocker signal exceeds a predefined value, diversity baseband processor 745 may assign a weight of zero to and thereby disregard the signal received from the receive channel 730, thus effectively making diversity receiver 750 a single-channel receiver.

In accordance with one embodiment of the present invention, to distinguish between a blocker signal and the desired signal, the signal strength indicated by RSSI circuit 740 is compared with the signal strength sensed by receive channel 710. The signal sensed by receive channel 710 may be sensed at an input terminal of the integrated circuit in which unit 700 is disposed or at output terminal of LNA 714. If the difference between the signal detected by RSSI 740 and the signal sensed by receive channel 710 exceeds a predetermined threshold, then the signal detected by RSSI circuit 740 is considered a blocker signal.

In accordance with another embodiment of the present invention, to distinguish between a blocker signal and the desired signal, relatively large increases in the signal detected by RSSI circuit 740 are kept track of. If a large increase in the signal detected by RSSI circuit 740 occurs without a corresponding increase in the desired signal as sensed by receive channel 710, then the signal detected by the RSSI circuit is considered a blocker signal. When transceiver 790 stops transmitting, receiver 750 uses receive channels 710 and 730 in accordance with the diversity mode of operation.

As shown in FIG. 7, diversity receiver 700 dispenses the need for a second saw filter in the receive channel 730 without significantly degrading the performance. In an alternative embodiment, a simple and low-cost filter may be used between antenna AN22 and LNA2. A received signal strength indicator (RSSI) circuit RS2 positioned in receiver RX2 is used to detect the presence of a blocker signal BL1. The detection of blocker signal can be implemented as shown, or moved to any part of the receiver chain where such detection can be performed. Well-known RSSI circuits can be employed to perform this function, and may be frequency-selective or broadband, as dictated by a particular application. In accordance with another embodiment of the present invention, the RSSI circuit is place in the RX1 receiver, which allows attenuated levels of the blocker signal BL1 to be detected. The absence of filter in the receive channel 730 provides the advantage of reducing the noise figure and avoiding unnecessary insertion loss of receive channel 730 when transceiver 790 is not transmitting. Accordingly, receiver 750 operates at least as effectively as a conventional single-path receiver when TT1 660 of FIG. 6 is transmitting, and significantly better than a conventional diversity receiver when transceiver TT1 is not transmitting. It is understood that the invention may be embodied in many different forms and should not be construed as being limited to the exemplary embodiments set forth herein. Rather, the exemplary embodiments are provided so that this disclosure is thorough and complete, and to convey the concepts of the invention to those skilled in the art. For example, filter SF1 can be a microwave ceramic filter or any other narrowband or broadband filter depending on the application. Although shown in FIG. 7 that filter 712 is interposed between antenna AN21 and LNA1, an additional LNA can be interposed between antenna AN21 and filter 712 to improve the receiver sensitivity.

A description of algorithms in the diversity receiver system is as follows:
1. When TT1 790 is not transmitting, receiver RR1 750 operates both RX1 710 and RX2 730 in diversity mode, and uses RX2 730 as the primary channel for all diversity combining calculations.
2. During periods where TT1 790 is not transmitting, the diversity system benefits from sensitivity improvements due to the absence of any front-end filtering loss in the receiver RX2.
3. Receiver unit 750 relies on RSSI circuit RS2 (740) to detect when TT1 790 is transmitting. For example, this may be done by sensing if the blocker signal is at a level that exceeds receive channel RX1's threshold for blocker tolerance.
4. Herein transmission by TT1 may give rise to a condition where a blocker is present.
5. When a blocker is present, diversity baseband processor BB1 reduces the SNR weighting associated with receive channel RX2, in a manner that may be proportional to the blocker strength as sensed by RSSI circuit RS2. For example, if blocker BL1 is very strong, receiver unit RR1 may completely disregard the signal received by RX2, making RR1 (750) effectively a single-channel receiver.
6. Various methods for distinguishing between blocker BL1 and a strong desired signal C1 may be employed.
   a. One such method is to compare the signal strength indicated by RSSI circuit RS2 with the signal strength received by RX1, and to sense when this difference exceeds some predetermined threshold.
   b. An enhancement of this method is to sense when a large jump in the output of RSSI circuit 740 occurs, without a corresponding jump in the desired signal sensed by receive channel RX1.
7. When TT1 790 ceases transmission, receiver unit RR1 may resume diversity combining using receive channel RX2.
8. In a diversity system with more than two paths, this system can be generalized by combining an arbitrary mix of receiver paths with and without SAW filters.
9. The paths without these filters each may implement a RSSI circuit or they may rely on the RSSI circuit from one of the unfiltered receiver paths to control the weighting of the unfiltered paths.

Referring to FIG. 7, the blocker signal detected by RSSI circuit 740 may couple into the receive channel RX1 bypassing the filter SF1, thereby adversely affecting the operation of receiver 750. To minimize this coupling, a circuit is used to attenuate or eliminate signals received by receive channel 730. One way to minimize this coupling is to implement a circuit to significantly attenuate or eliminate signals into receive channel RX2.

Figure 8:
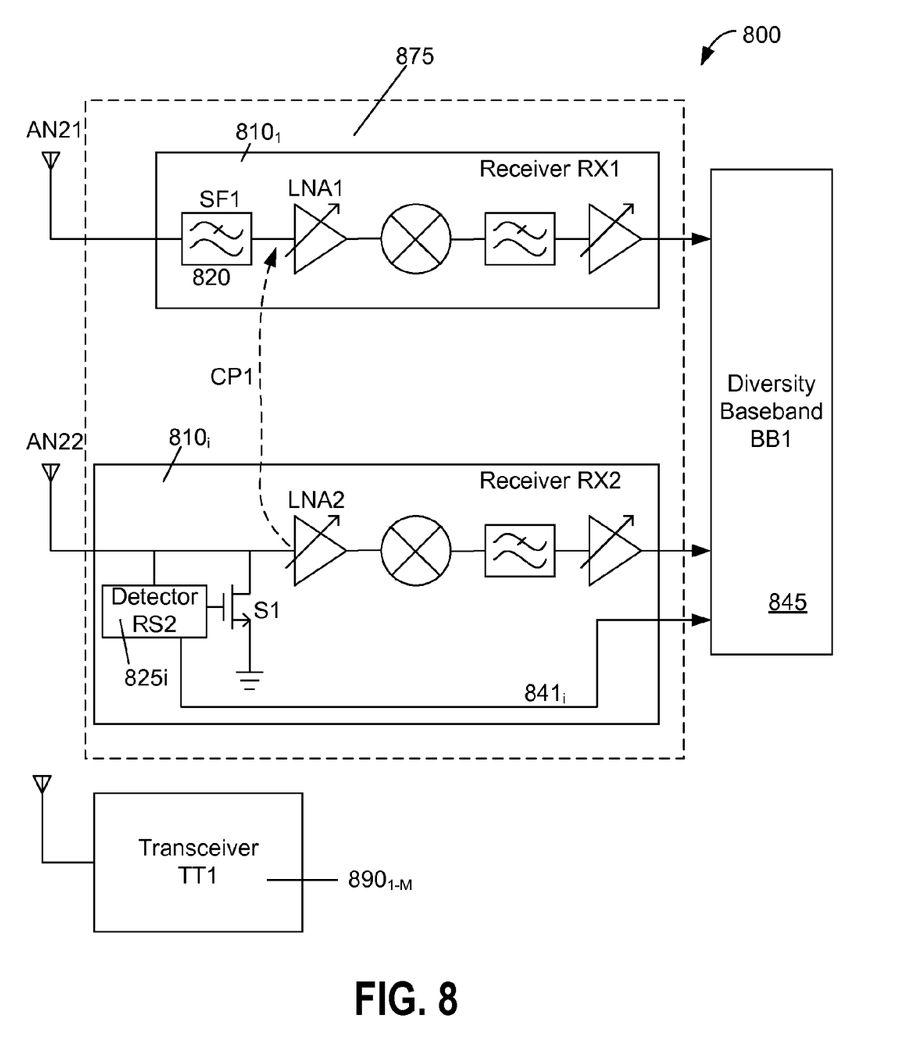
FIG. 8 is a block diagram of a handset unit that includes a diversity receiver and a transceiver, in accordance with an embodiment of the present invention.

An embodiment of such a circuit is shown as a bypass circuit S1 in FIG. 8. Bypass circuit S1 operates as follows. When RSSI circuit RS2 detects a blocker, it causes bypass circuit S1 to turn on. When turned on, S1 shorts out the signal path from antenna AN22 to RX2, effectively eliminating or significantly attenuating coupling to CP1. In a specific embodiment, bypass circuit S1 may be an N-type transistor. In an embodiment, bypass circuit S1 is an NMOS transistor.

In another embodiment, bypass circuit S1 is an NPN transistor. In an embodiment, RSSI circuit RS2 may send directly an output signal 841 to baseband processor BB1 in order to allow diversity baseband processor to more expeditiously and accurately sense the level and presence of blocker BL1, and adjust its diversity weighting appropriately.

Referring to FIG. 8, although handset unit 800 shown as having one receive channel RX1, one receive channel RX2, and one transceiver TT1, one of skilled in the art would appreciate that embodiments of the present invention could be applied to handset units that may include N receive channels $810_1, 810_2 \ldots 810_N$ that together form a receiver 875, and M transceivers $890_1, 890_2 \ldots 890_M$. It is understood that M and N are integers that may or may not be equal. It is further understood that a handset unit, in accordance with embodiments of the present invention may have more receivers each having a number of receiving channels.

As shown in FIG. 8, one or more of the receiving channels $810_i$ (i is an integer varying from 1 to N) include a SAW filter, such as SAW filter 820 shown in receiving channel $810_1$, and each of the remaining receive channels $810_i$ includes an RSSI circuit, such as RSSI circuit $825_i$ shown in receiving channel $810_i$, and RSSI circuit $825_N$ in receiving channel $810_N$ (not shown). The diversity baseband processor 845 is coupled to all the receiving channels. The RSSI circuits are operated in the same manner as described above with respect to FIG. 7.

Performance Enhancement in a Single-Antenna System

Figure 9A:
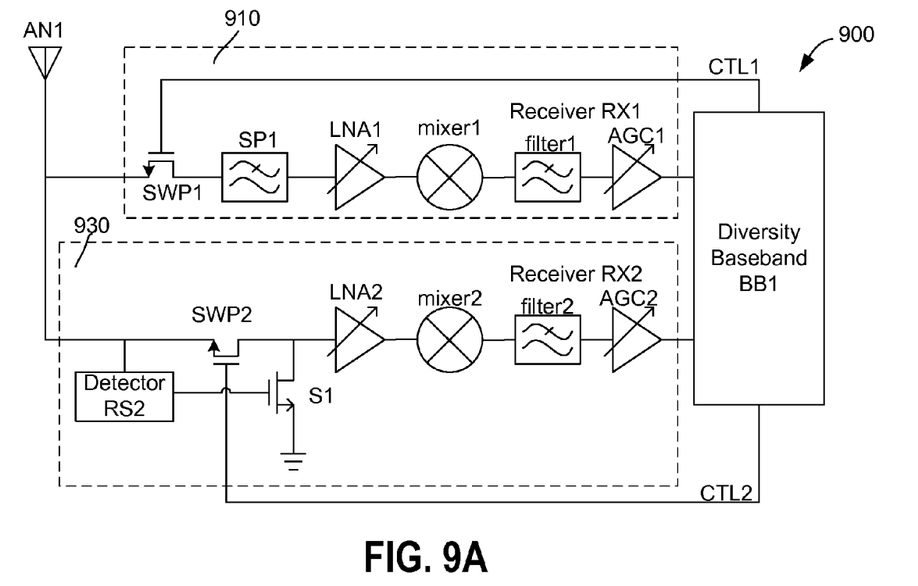
FIG. 9A is a block diagram of a handset unit that includes a diversity receiver having a single antenna, in accordance with another embodiment of the present invention.

In addition to providing a system and method for combining the signals from two or more antennas, embodiments of the present invention may also be modified in order to enhance the sensitivity of single antenna systems by connecting a single source, such as an antenna, to both receivers of a diversity system. Referring to FIG. 9A, receiver RX1 includes a switch SWP1, a front-end signal processing element SP1, a low noise amplifier LNA1, a mixer mixer 1 and an amplifier AGC1. Front-end signal processing element SP1 provides filtering, attenuation or amplification functions such as eliminating unwanted out-of-band signals ("blockers," "jammer"), increased signal-handling, or improved sensitivity. Front-end signal processing element SP1 can increase noise and insertion loss (decreased sensitivity) in the case of a filter or attenuator, increase power consumption, or degrade ability to handle strong signals. Cost and size of SP1 is also a drawback. Receiver RX2 includes a switch SWP2, a low noise amplifier LNA2, a mixer mixer 2, a filter filter 2, and an amplifier AGC2. As shown, receiver RX2 does not include a signal processing element such as SP1 which is present in receiver RX1. As described further below, receiver 900 uses this difference to provide the advantages of having SP1 while avoiding the drawbacks described above.

Figure 9B:
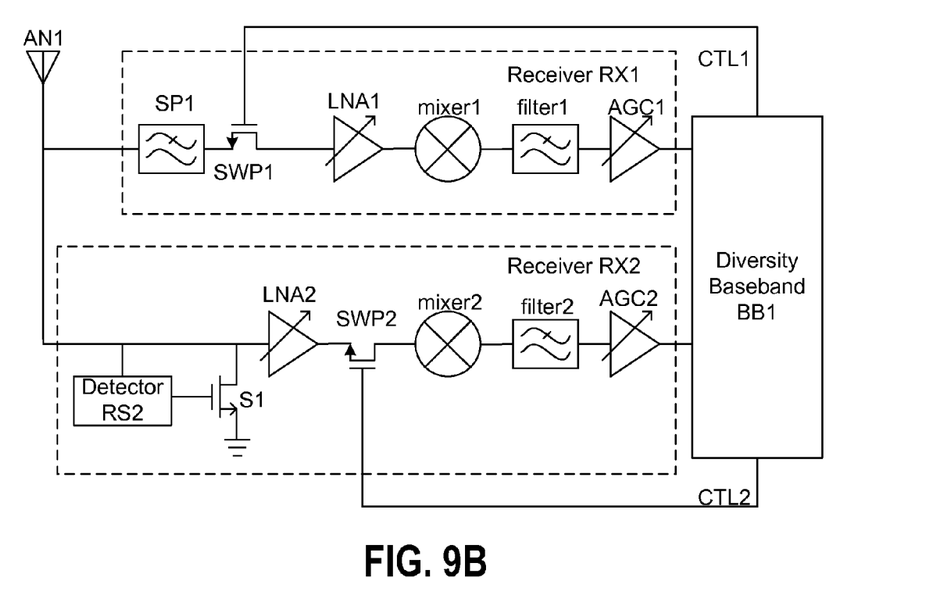
FIG. 9B is an alternative block diagram of a handset unit that includes a diversity receiver having a single antenna, in accordance with yet another embodiment of the present invention.

Switches SWP1 and SWP2 provide a high impedance when they are turned off, thereby enabling signal power to be diverted to other signal paths. This functionality may be implemented by other techniques. For example, SWP1 may be relocated so that it follows SP1, instead of preceding it, as shown in FIG. 9B. SWP1 and SWP2 are controlled by signals CTL1 and CTL2 from a state machine or processor, as is known.

During one mode of operation where the advantages of SP1 are desired, switch SWP1 is turned on, SWP2 is turned off, and the signal from the antenna AN1 is substantially routed to RX1. Optionally, SWP2 may be turned on to enable both signal paths during this mode of operation so as to improve the overall performance of the system, such as when splitting the power from antenna AN1 improves the maximum power handling capability of the receiver.

In a second mode of operation, where the benefits of SP1 are not necessary, SWP1 is turned off and SWP2 is turned on, thus supplying the signals from the antenna substantially to signal path 2 and avoiding the drawbacks of SP1. If SP1 is an active device requiring power, it may be turned off in this mode to conserve power.

FIG. 9B is an alternative simplified block diagram of a handset unit that includes a diversity receiver having a single antenna, in accordance with yet another embodiment of the present invention. As shown, switches SWP1 is placed between signal processing element SP1 and LNA1 and SWP2 is placed between NLA2 and mixer 2. Many alternatives, modifications, and variations will be apparent to those skilled in the art. For example, switch SWP1 may be interposed between LNA1 and mixer 1 in an embodiment.

In an exemplary embodiment, baseband processor BB1 may turn off receive channel RX1 including SP1, LNA1, filter 1 and amplifier 1 when it turns off switch SWP1. Similarly, when detector RS2 detects a blocker having a sufficient signal strength or energy level, detector RS2 turns on bypass circuit S1 and at the same time sends an output signal to baseband processor BB1, which, in turn, turns off the receiver RX2 including LNA2, mixer 2, filter 2, and amplifier AGC2 to conserve power.

Figure 10:
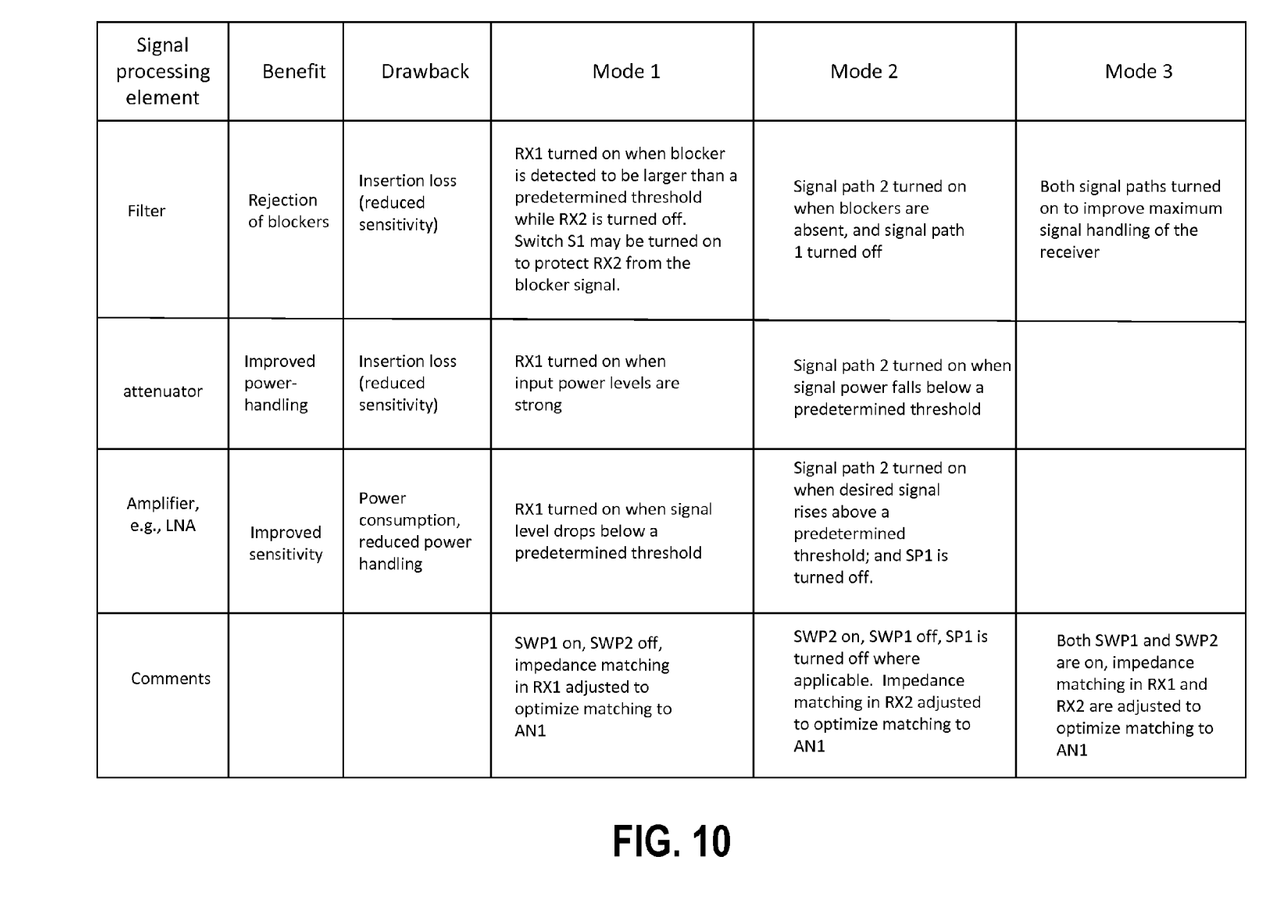
FIG. 10 is a diagram summarizing the different operating modes of the diversity receiver, in accordance with embodiments of the present invention.

FIG. 10 provides example embodiments of the present invention for various modes of operation, and the advantages and disadvantages associated with various states of SP1. In some embodiments, blockers and signal levels can be detected by detector RS2 or by signal processing elements present within diversity baseband processor BB1. As described above, signal processing element SP1 of FIGS. 9A and 9B can be one of a SAW filter, a microwave ceramic filter, an attenuator, or a low noise amplifier. When SP1 is a filter, it provides the benefit of blocker rejection. However, as filter, SP1 will introduce an insertion loss to the signal path 1 or receive channel 910 (in the following, signal path and receive channel will be used alternatively). There are three possible modes of operation when SP1 is a filter. In operating mode 1, receiver RX1 is turned on when a blocker (jammer) is detected to be greater than a predetermined threshold level. Bypass circuit S1 may be turned on to protect LNA2 of the receiver RX2. In operating mode 2, signal path 2 is turned on when blocker are absent, and signal path 1 is turned off. In operating mode 3, both signal paths are turned on to improve the maximum signal handling of the receiver 900.

In a specific embodiment, signal processing element SP1 is an attenuator when the received signals via antenna AN1 are strong. An attenuator has the disadvantage of adding insertion loss and noise figure to the receive path. If the received signals via antenna AN1 are strong, receiver RX1 is turned on and receiver RX2 may be turned off to conserve power. In operating mode 2, signal path 2 may be turned on when the received signal power falls below a predetermined threshold level.

In an alternative embodiment, signal processing element SP1 is a low noise amplifier to improve the receiver sensitivity. As a drawback, SP1 will consume power. In operating mode 1, the receive path 910 is turned on when the received signal level through antenna AN1 is below a predetermined threshold level, and receive path 930 is turned off. When the received signal level through antenna An1 is above the predetermined threshold level, signal path 2 (i.e., receive path 930) is turned on and the amplifier SP1 is turned off, and with it, the receive path 910 is turned off to conserve power. The last row of FIG. 10 summarizes the state of switches SWP1 and SWP2 for the operating modes. In operating mode 1, switch SWP1 is turned on and SWP2 is turned off, the input impedance of receive path 910 may be fine-tuned to match the impedance of antenna AN1 for an optimal reception. In operating mode 2, switch SWP2 is turned on and SWP1 is turned off. Signal processing element SP1 may also be turned off. The input impedance of receive path 930 will be fine tuned to match the impedance of antenna AN1 for an optimal reception. In operating mode 3, both switches SWP1 and SWP2 are turned on. The input impedance of both receive paths RX1 and RX2 will be adjusted to match the impedance of antenna AN1.

As described herein, embodiments of the present invention provide a method and system of connecting a single antenna to a diversity receiver in such a manner as to allow a signal processing element such as a filter, attenuator or amplifier to be employed by a receiver system whenever it is beneficial to the overall performance of the receiver. Accordingly, embodiments of the present invention use a diversity receiver to dynamically select the enabling or disabling of the signal processing element.

Handling Gain Imbalance Between Antennas

In a diversity system that contains multiples antennas, when the signal-to-noise ratio (SNR) of the desired signal (often but not always related to the power of the desired signal) from the antennas are similar to each other, diversity algorithms can yield a significant gain over single channel receiver. In a practical system, there can be large differences in power or SNR among the antennas because of a number of factors, including but not limited to the following:

1) Asymmetry in antenna design: antenna gain in the diversity antennas may vary from antenna to antenna due to design constraints. As a result, signal to noise ratio of the desired signal may also vary significantly from antenna to antenna;

2) Differences in path loss and fading: signals being received by the antennas may experience different path losses or fading, resulting in large difference in signal power or signal to noise ratio.

Embodiments of the present invention are described with reference to a two-antenna diversity system. However, it is understood to those skilled in the art that embodiments of the present invention may be applied to any number of antennas. Reference is made below to situations where a relatively large gain difference exists between antennas. The gain difference is also referred to as the gain gap. In the following description, we refer to the antenna which has a weaker signal or lower SNR as the weak antenna, and the receiver connected to the weak antenna as the weak receiver. The gain gap may result in degraded performance as described below:

1. In a situation where there are two antennas, a gain gap will also limit the diversity gain to small values because only one signal is dominant; at the same time, the diversity system is consuming considerably more power with limited benefits;

2. SNR is often used as one factor in the weighting of diversity signals. If the signal level of the weak antenna is below the noise level, the signal power estimate or the SNR estimate for that antenna would be inaccurate, which may cause performance degradation due to erroneous weighting or errors in other diversity calculations.

Because of these potential drawbacks, it is therefore desirable to disable diversity combining when a gain gap occurs.

Figure 11:
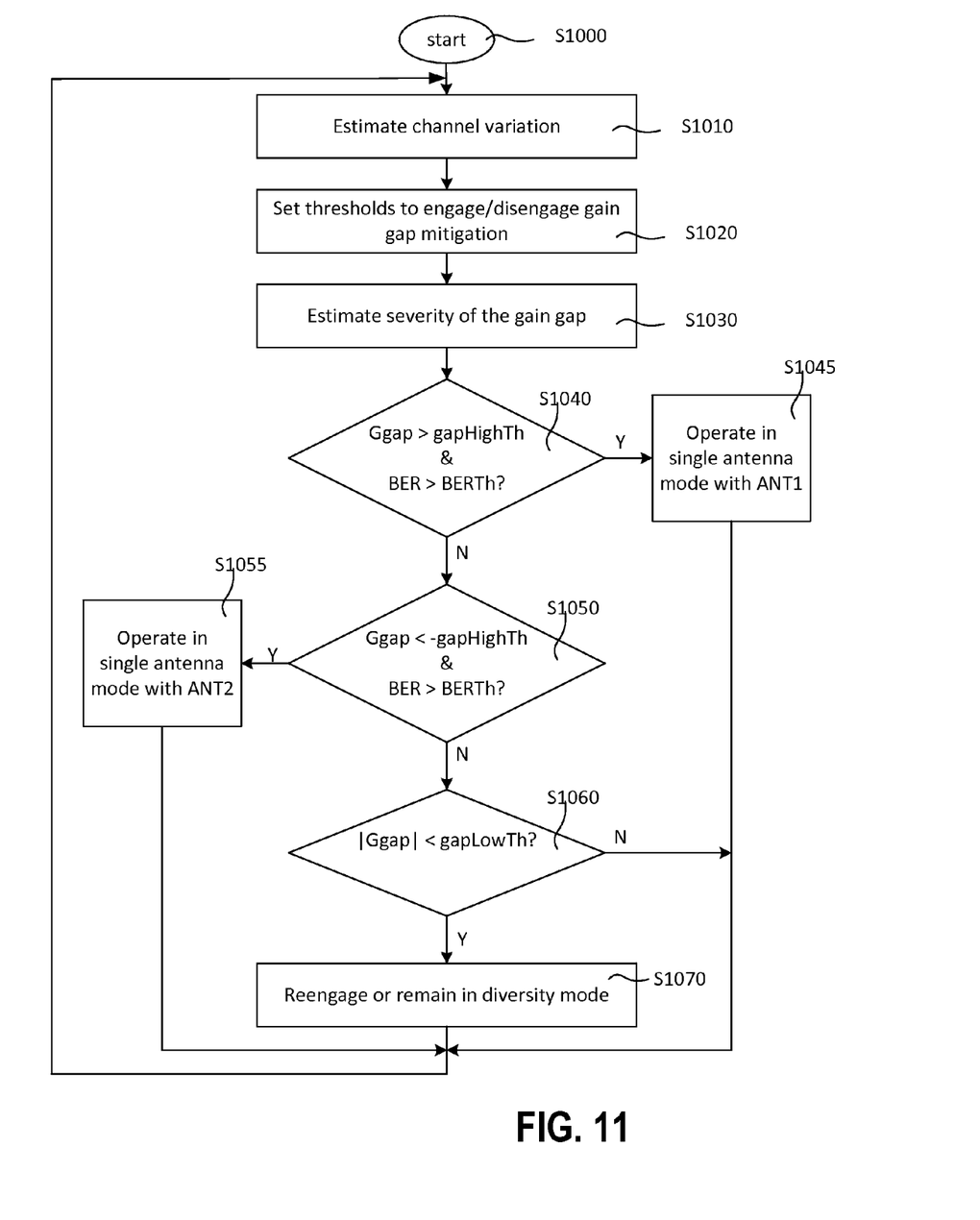
FIG. 11 is a flowchart diagram illustrating a method of controlling a diversity receiver, in accordance with an embodiment of the present invention.

FIG. 11 is an example flow diagram illustrating a process of controlling a diversity receiver unit, in accordance with an embodiment of the present invention. Referring to FIG. 11, a receive handset starts reception of signals via a number of receive channels at step 1000. The received signals may have different fading characteristics. At step 1010, an amount of channel variation and fading in the respective received signals is estimated. In an embodiment, the amount of channel variation can be determined via the Doppler frequency associated with the receive channel. Doppler frequencies can be obtained using well-known techniques. At step 1020, the process sets thresholds for engaging or disengaging the gain gap mitigation. In a preferred embodiment of achieving gain gap mitigation, the process may uses three thresholds: (i) a gapHighTh, the threshold for the value of gain gap above which to engage the gain gap mitigation; (ii) gapLowTh, the threshold for the value of the gain gap below which to engage gain gap mitigation. Having gapHighTh and gapLowTh allows some form of hysteresis to be implemented in the system; and (iii) BERTh, the threshold for bit error rate (BER) above which to engage gain gap mitigation.

In an embodiment, the thresholds are empirically set to vary as Doppler frequencies increase (e.g., using a look-up table). The expected diversity gain depends from the Doppler frequency. In this embodiment, the gain gap thresholds increase as the expected diversity gain (as determined by the Doppler frequency) increases in an empirically-optimized manner. In another embodiment, the gain gap thresholds may also be made dependent on the signal modulation and coding rate, or estimates of the SNR.

At step 1030, the severity of gain gap between the receiving channels is estimated. In an embodiment, the estimation of the gain gap severity may be obtained by computing the difference of the SNR (signal-to-noise ratio) or the signal power from each receiving paths and averaging over a time interval. For the exemplary embodiment of space diversity having two antennas, the difference will be between RSSI1 and RSSI2 of the respective antennas ANT1 and ANT2 and the gain gap is obtained by averaging this difference over come time interval as follows: Ggap=average (RSSI1−RSSI2).

Referring to FIG. 8, the gain settings for each receiver RX1 and RX2 may also be used as a proxy for desired signal strength from each antenna. When gain gap Ggap is positive, this indicates antenna 2 is the weak antenna. Likewise when Ggap is negative, this indicates antenna ANT1 is the weak antenna.

At step 1040, a gain gap is detected when Ggap and BER both exceed their respective thresholds. A number of possible actions can be implemented when a gain gap is detected: (a) Simply disregard the weak receiver and bypass the diversity combining calculations, to operate in single receiver mode; (b) Alternatively, combining parameters in the diversity combining may be set to freeze the phase combining parameters and to set the weight of the weak receiver to zero; and (c) In addition to this, the weak receiver may be turned off to conserve power.

In the exemplary embodiment of a two antenna diversity receiver unit, if the gain gap is higher than a preset gapHighTh threshold level and the bit error rate is higher than a preset BER level (YES in step 1040), i.e., the antenna ANT2 is the weak antenna, then the diversity receiver unit will operate in a single antenna mode with ANT1 with the receive channel associated antenna ANT2 disabled (step 1045). If the gain gap is less than the preset negative gapHighTh threshold level and the bit error rate is higher than the preset BER level (YES in step 1050), i.e., the antenna ANT1 is the weak antenna, the diversity receiver unit will operate in a single antenna mode with ANT2 with the receive channel associated antenna ANT1 disabled (step 1055).

If it is determined that the gain gap is not less than the preset negative gapHighTh threshold level and the bit error rate is not higher than the preset BER level (NO in step 1050), and the absolute value of the gain gap is not lower than a preset gapLowTh threshold level (NO in step 1060), the diversity receiver will operate in a single antenna mode using antenna ANT1 (step 1045). If the gain gap is lower than the preset gapLowTh threshold level (YES in step 1060), the diversity receiver unit will operate in the diversity mode (step 1070) and the process returns to step 1010.

In an embodiment of the present invention, the antenna diversity of a receiver unit is turned on if an absolute value of the gain gap among multiple receive channels is below a preset gain gap low threshold value. In another embodiment, the antenna diversity of the receiver unit is turned off if the received signals have a gain gap higher than a preset gain gap high threshold value and the BER associated with the received signals is higher than a predetermined BER value. In an embodiment, the preset low and high gain gap threshold values may vary as a function of the Doppler frequency.

Many alternatives, modifications, and variations will be apparent to those skilled in the art in light of the above teachings. For example, although embodiments of the present invention are described having a TV receiver, they can also be applied to diversity receivers having a GPS unit.

It is understood that the above embodiments of the present invention are illustrative and not limitative. Various alternatives and equivalents are possible. The invention is not limited by the type of integrated circuits in which the present disclosure may be disposed. Other additions, subtractions or modifications are obvious in view of the present invention and are intended to fall within the scope of the appended claim.

What is claimed is:

1. A diversity receiver comprising:
   a first receiving channel receiving a first signal, the first receiving channel comprising:
      a filter adapted to filter the first signal to generate a filtered signal; and
      a first mixer responsive to the filtered signal to generate a third signal;
   a second receiving channel receiving a second signal, concurrently with the receipt of the first signal by the first receiving channel, the second receiving channel comprising:
      a second mixer responsive to the second signal to generate a fourth signal; and
      a received signal strength indicator (RSSI) circuit disposed in front of the second mixer and operative to detect whether a blocker signal received via the second receiving channel is greater than a threshold value; and
   a processor adapted to combine the third and fourth signals to generate a combined signal, said processor being further adapted to vary a weight assigned to the second signal in accordance with an output signal of the RSSI.

2. The diversity receiver of claim 1 wherein the first and second signals are received respectively via first and second antennas.

3. The diversity receiver of claim 1 wherein the threshold value is defined by the first signal.

4. The diversity receiver of claim 1 wherein the processor is a baseband processor.

5. The diversity receiver of claim 1 further comprising:
   a first switch disposed in the first receiving channel.

6. The diversity receiver of claim 5 further comprising:
   a second switch disposed in the second receiving channel.

7. The diversity receiver of claim 6 wherein said processor is further adapted to control the first and second switches.

8. The diversity receiver of claim 7 wherein the processor computes a difference between strengths of the third and fourth signals.

9. The diversity receiver of claim 1 wherein the processor is further adapted to:
   assign a weight of zero to the second signal if the (RSSI) circuit detects that the blocker signal is greater than the threshold value.

10. The diversity receiver of claim 1 wherein said filter is a saw filter.

11. A method of processing signals via first and second channels, the method comprising:
   receiving a first signal via the first channel;
   filtering the first signal to generate a filtered signal;
   frequency-shifting the filtered signal to generate a third signal;
   receiving a second signal via the second channel concurrently with the receipt of the first signal via the first channel;
   frequency-shifting the second signal to generate a fourth signal;
   detecting whether a blocker signal received via the second channel is greater than a threshold value thereby to generate a comparison signal;
   combining the third and fourth signals to generate a combined signal; and
   varying a weight assigned to the second signal in accordance with the comparison signal.

12. The method of claim 11 wherein the first and second signals are received respectively via first and second antennas.

13. The method of claim 12 further comprising:
   computing a difference between the third and fourth signals.

14. The method of claim 12 further comprising:
   applying a weight of zero to the second signal if the blocker signal is detected as being greater than the threshold value.

15. The method of claim 11 wherein the threshold value is defined by the first signal.

16. The method of claim 11 further comprising:
   combining the third and fourth signals using a baseband processor.

17. The method of claim 11 further comprising;
   applying the first signal to the first channel via a first switch.

18. The method of claim 17 further comprising;
   applying the second signal to the second channel via a second switch.

19. The method of claim 18 further comprising:
   controlling the first and second switches via a processor adapted to generate the combined signal.

20. The method of claim 11 further comprising:
   filtering the first signal, using a saw filter, to generate the filtered signal.

* * * * *